United States Patent [19]
Braeckelmann

[11] 3,949,169
[45] Apr. 6, 1976

[54] DEVICE FOR THE TRANSMISSION OF PUSH-PULL SIGNALS

[75] Inventor: Walter Braeckelmann, Weidach, Germany

[73] Assignee: Siemens Aktiengesellschaft, Berlin & Munich, Germany

[22] Filed: Dec. 19, 1974

[21] Appl. No.: 534,427

[30] Foreign Application Priority Data
Jan. 9, 1974    Germany............................ 2400940

[52] U.S. Cl.................................. 178/68; 333/10
[51] Int. Cl.² ......................................... H04Q 5/00
[58] Field of Search ............. 178/68, 66; 333/10, 6; 340/167 R, 170

[56] References Cited
UNITED STATES PATENTS
3,516,065   6/1970   Bolt et al. ............................ 178/68

Primary Examiner—Thomas A. Robinson
Attorney, Agent, or Firm—Hill, Gross, Simpson, Van Santen, Steadman, Chiara & Simpson

[57] ABSTRACT

A device for the transmission of digital push-pull signals with a push-pull transmitter and a push-pull receiver includes a push-pull directional coupler connected between the transmitter and the receiver for providing coupling pulses to set and reset the push-pull receiver, which may be designed as a bistable trigger stage, the push-pull signals to be transmitted being obtained from the outputs of the push-pull receiver. The directional coupler comprises an arrangement of at least five parallel conductors of which at least one conductor is grounded. One end of each conductor is connected to a first pair of the pulse conductors is connected to a respective output terminal of the transmitter, while corresponding ends of another pair of pulse conductors are connected to the input terminals of the receiver, the other ends of the respective conductor pairs being bridged by respective impedances which correspond to the value of the surge impedances of the conductors.

6 Claims, 3 Drawing Figures

DEVICE FOR THE TRANSMISSION OF PUSH-PULL SIGNALS

BACKGROUND OF THE INVENTION

1. Field of the Invention

This invention relates to a device for the transmission of digital push-pull signals (difference timing signals) with a push-pull transmitter and a push-pull receiver.

Description of the Prior Art

Digital signals of a high bit frequency are usually transmitted by a push-pull (difference pulsing) technique over long distances, for example between the peripheral devices of a data processing system and its central unit. As an example of this technique one may take reference to "The Electronic Engineer", May 1969, Pages 58 to 61.

The advantage of push-pull transmission resides in the lack of sensitivity to dynamic in-phase disturbances. Static in-phase disturbances, in particular different ground potentials at the transmitting end and the receiving end, can lead to high compensating currents and a severe impairment to transmission because of the intervening electrical connection.

SUMMARY OF THE INVENTION

The primary object of the invention is to further develop a transmission device of the type defined in the introduction above, while retaining its advantages, in such a manner that the disadvantageous d-c connection between the push-pull transmitter and the push-pull receiver is avoided.

In accordance with the invention, this object is realized in that a push-pull directional coupler is interposed between a push-pull transmitter and a push-pull receiver. The push-pull receiver may be designed as a bistable trigger stage and provide at its outputs the push-pull signals which are to be transmitted. The push-pull directional coupler gives rise to coupling pulses to set and reset the push-pull receiver.

BRIEF DESCRIPTION OF THE DRAWING

Other objects, features and advantages of the invention, its organization, construction and operation will be best understood from the following description of exemplary embodiments thereof taken in conjunction with the accompanying drawing, on which.

DESCRIPTION OF THE PREFERRED EMBODIMENTS

Figure 1:
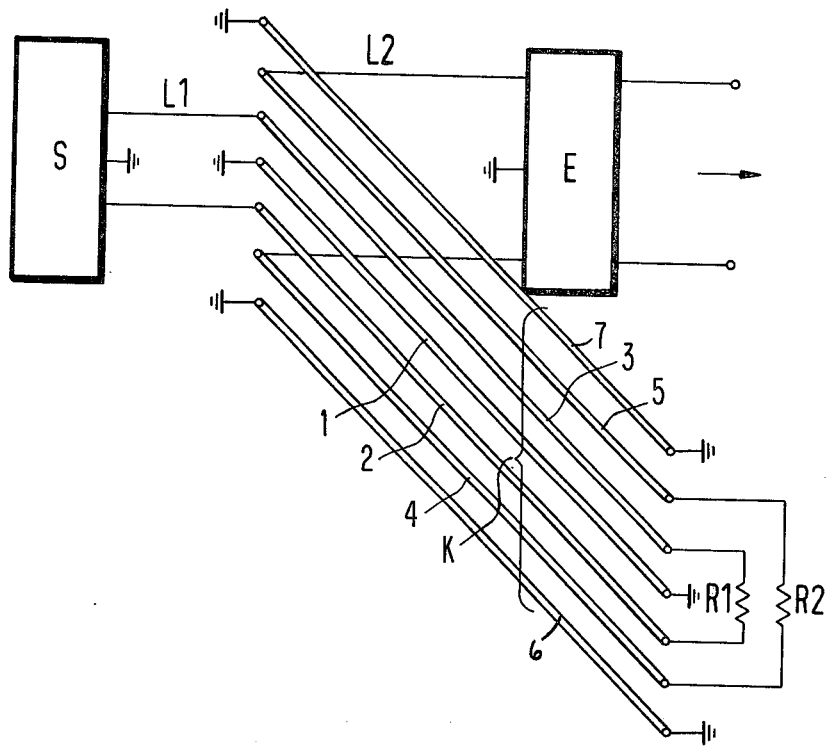
FIG. 1 is a schematic illustration of a transmission device having a push-pull directional coupler interposed in the transmission path, the coupler having a specific conductor arrangement.

Referring to FIG. 1, a grounded push-pull transmitter S is connected to a similarly grounded push-pull receiver E by way of a push-pull directional coupler K. In the exemplary embodiment of the invention illustrated in FIG. 1, the directional coupler K comprises five parallel conductors arranged in the same plane, the conductors constituting a flat cable or a portion of the wires of a multi-wire flat cable, for example. The conductors possess, at least in pairs, the same distances to the central conductor 1; usually, however, all of the conductors which lie adjacent each other are spaced by the same distances. The central conductor 1 is grounded. The two conductors 2 and 3 which lie nearest the central conductor are connected, via a sub-portion L1 of the transmission path, to the outputs of the push-pull transmitter S. The phase-opposing inputs of the push-pull receiver E are connected to the two conductors 4 and 5 via a further sub-portion L2, and in fact at the end of the push-pull directional coupler at which the push-pull pulses are fed in.

In response to energization by the output pulses of the transmitter S, the directional coupler K gives rise to coupling pulses as the same are induced from the conductors 2 and 3 onto the conductors 4 and 5. The bistable push-pull receiver E is set or reset by the phase-opposing coupling pulses induced on the conductors 4 and 5, in dependence upon the polarity of the coupling pulses. At the outputs of the receiver, the pulses to be transmitted are available, in their original form, for further processing in devices which are not illustrated on the drawings. It is advantageous and expedient in practicing the invention for the bistable push-pull receiver to be in the form of a push-pull amplifier having good in-phase rejection properties, which, by suitable feedback, can be provided with bistable switching characteristics.

The two pairs of conductors 2, 3 and 4, 5 of the push-pull directional coupler K, which in the following will be referred to as pairs of pulse conductors, are in each case terminated with a surge impedance R1 and R2, respectively, at those ends which are removed from the connection point of the push-pull directional coupler K. It is clear that the output impedance of the push-pull transmitter S, the impedance of the push-pull receiver E and the surge impedances of the sub-portions L1 and L2 must be matched to the corresponding surge impedances of the pairs of pulse conductors. In order to reduce the surge impedance, in particular of the outer pair of pulse conductors, further grounded conductors 6, 7 can be arranged in parallel to the outer conductors 4, 5. The grounded outer conductors also serve to screen the push-pull directional coupler K from other pulse lines running in the vicinity. The roles of the two pairs of pulse conductors are interchangeable.

The push-pull directional coupler K emits serviceable coupling pulses only when the duration $d_P$ of the driving pulse is greater than twice the signal transmit time $2d_L$ over the coupling path. The duration $t_K$ of the coupling pulses then amounts to at least $2d_L$. Furthermore, the duration $t_K$ of the coupling pulses may be set in an arbitrary fashion by lengthening the push-pull directional coupler K. The amplitudes of the coupling pulses are independent of the flank gradient (rise time) of the driving pulse. The polarity of the coupling pulses is determined by the direction of the change in voltage of the driving pulses. In order to enable the push-pull receiver E to retain the binary switching states determined by the particular polarity of the coupling pulses, even when the coupling pulses have died out, it is necessary for the internal signal transit time $d_E$ in the push-pull receiver, including any feedback circuit, to be shorter than the duration of the coupling pulses. The time conditions for a satisfactory function of the transmission device are, therefore $$d_E < t_K < d_P$$

and for a minimum duration of the coupling pulses the time conditions have the relationship $$d_E < 2d_L < d_P.$$

Figure 3:
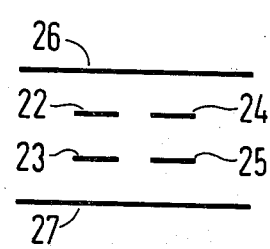
FIG. 3 is a diagrammatic illustration of yet another conductor arrangement of a push-pull directional coupler constructed in accordance with the invention.
Figure 2:
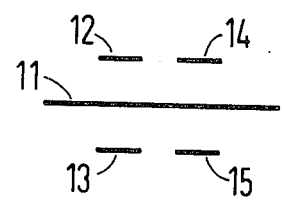
FIG. 2 is a diagrammatic illustration of another embodiment of a push-pull directional coupler.

In addition to the arrangement of the conductors of the push-pull directional coupler described with reference to FIG. 1, there are also many other possible constructions. Two of these possibilities are represented in FIGS. 2 and 3 which are generally cross-sectional views through the conductor arrangements with insulating layers being omitted. The individual conductors can, for example, be etched conductor paths in a multi-layer circuit board.

In the exemplary embodiment illustrated in FIG. 2, the conductors 12, 13 and 14, 15 of the two pairs of pulse conductors arranged next to one another are in each case arranged homologously to the grounded central conductor 11. It is advantageous to select the width of the central conductor 11 to be greater than the spacing between the outer edges of the pulse conductors, as is generally illustrated on the drawing.

The pairs of pulse conductors comprising the conductors 22, 23 and 24, 25 are also arranged next to one another in the embodiment of the push-pull directional coupler illustrated in FIG. 3. In this case, two grounded conductors 26 and 17 are arranged on both sides of the pairs of pulse conductors. The distances between the grounded conductors 26, 27 and the particular adjacent conductors of the pairs of pulse conductors are to be equal, and their width is to be greater than the distance between the outer edges of the pulse conductors, as also illustrated in FIG. 3.

The position on the transmission path at which the push-pull directional coupler is inserted, i.e. the length ratio of the two subportions L1 and L2 may be freely selected. However, it is advantageous to locate the connection point of the push-pull directional coupler approximately at the end of the transmission path, as the coupling pulses possess a lower amplitude than the driving pulses and therefore can be disturbed more easily than the latter.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Apparatus for the transmission of digital push-pull signals, comprising: a push-pull transmitter for emitting driving pulses; a bistable push-pull receiver responsive to coupling pulses to emit push-pull signals to be transmitted; and a push-pull directional coupler interposed between said transmitter and said receiver, said push-pull directional coupler responsive to said driving pulses to produce coupling pulses to set and reset said receiver causing emission of said push-pull signals, said directional coupler comprising at least six parallel conductors which include a first pair of conductors each connected at one end thereof to said transmitter, a second pair of conductors each connected at one end thereof to said receiver, the conductors of said first and second pairs symmetrical about a plane, and a pair of grounded conductors arranged outside of said first and second pairs of conductors and symmetrically about the same plane, each of the grounded conductors having a width that is several times greater than the width of the other conductors, and first and second impedances equal to the surge impedances of the respective first and second pairs of conductors and connected across the other ends of the respective pairs of conductors.

2. Apparatus for the transmission of digital push-pull signals, comprising: a push-pull transmitter for emitting driving pulses; a bistable push-pull receiver responsive to coupling pulses to emit push-pull signals to be transmitted; and a push-pull directional coupler interposed between said transmitter and said receiver, said push-pull directional coupler responsive to said driving pulses to produce coupling pulses to set and reset said receiver causing emission of said push-pull signals, said directional coupler comprising at least five parallel conductors, at least one of said conductors connected to ground; a first pair of said conductors connected at first ends thereof to said transmitter with the conductors of said first pair equal distances from said grounded conductor, a second pair of said conductors connected at first ends thereof to said receiver with the conductors of said second pair equal distances from the grounded conductor, and first and second impedances, said first impedance connected across the second ends of said first pair of conductors, said second impedance connected across the second ends of said second pair of conductors, each of said impedances corresponding to the respective surge impedances of the pairs of conductors.

3. Apparatus according to claim 2, wherein all of said conductors lie in the same plane.

4. Apparatus according to claim 2, wherein said grounded conductor is a conductive layer having a width which is several times the width of the conductors of the pairs of conductors, and wherein the conductors of each pair are arranged symmetrically about the grounded conductor with one conductor of the first pair lying next to one conductor of the second pair on each side of the grounded conductor.

5. Appartus according to claim 2, wherein said coupler comprises an odd number of conductors arranged in the same plane, the central conductor being the grounded conductor and the pairs of conductors arranged symmetrically with respect to the grounded conductor with the conductors of the second pair arranged outermost in the plane.

6. Apparatus according to claim 5, comprising an additional pair of grounded conductors arranged outboard of the second pair of conductors and symmetrically with respect to the central grounded conductor to reduce the surge impedance of said second pair of conductors.

* * * * *